United States Patent
Whitaker et al.

(10) Patent No.: US 12,141,783 B1
(45) Date of Patent: Nov. 12, 2024

(54) PAYMENT SPLITTING

(71) Applicant: UIPCO, LLC, San Antonio, TX (US)

(72) Inventors: Charise Renee Whitaker, San Antonio, TX (US); Michael J. Maciolek, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 857 days.

(21) Appl. No.: 17/104,840

(22) Filed: Nov. 25, 2020

Related U.S. Application Data

(60) Provisional application No. 62/941,417, filed on Nov. 27, 2019.

(51) Int. Cl.
| | |
|---|---|
| *G06Q 20/32* | (2012.01) |
| *G06K 7/10* | (2006.01) |
| *G06K 7/14* | (2006.01) |
| *G06K 19/06* | (2006.01) |
| *G06Q 20/02* | (2012.01) |
| *G06Q 20/20* | (2012.01) |
| *G06Q 20/40* | (2012.01) |

(52) U.S. Cl.
CPC ....... *G06Q 20/3276* (2013.01); *G06K 7/1413* (2013.01); *G06K 7/1417* (2013.01); *G06K 19/06028* (2013.01); *G06K 19/06037* (2013.01); *G06Q 20/02* (2013.01); *G06Q 20/201* (2013.01); *G06Q 20/204* (2013.01); *G06Q 20/208* (2013.01); *G06Q 20/3224* (2013.01); *G06Q 20/40* (2013.01); *G06K 2007/10504* (2013.01)

(58) Field of Classification Search
CPC ....... G06K 19/06028; G06K 19/06037; G06K 7/1413; G06K 7/1417; G06N 20/00; G06Q 20/3276; G06Q 20/02; G06Q 20/201; G06Q 20/204; G06Q 20/208; G06Q 20/3224; G06Q 20/40
USPC .......................................................... 705/17
See application file for complete search history.

(56) References Cited

U.S. PATENT DOCUMENTS

| | | | |
|---|---|---|---|
| 10,692,140 B1* | 6/2020 | Kim ..................... | G06Q 20/405 |
| 2015/0186871 A1* | 7/2015 | Laracey ............. | G06Q 30/0226 |
| | | | 705/41 |
| 2015/0206164 A1* | 7/2015 | Espana .............. | G06Q 30/0267 |
| | | | 705/14.23 |

OTHER PUBLICATIONS

Quintanilha, Bruno Pires Lavigne. Detouch: Extending Service Channels in an Airport Through Touch Technologies. Universidade da Madeira (Portugal) ProQuest Dissertations Publishing, 2016. (Year: 2016).*

* cited by examiner

*Primary Examiner* — Florian M Zeender
*Assistant Examiner* — Fawaad Haider
(74) *Attorney, Agent, or Firm* — Perkins Coie LLP

(57) ABSTRACT

The described payment splitting technology can enable a person to split a cost of a product over a number of payments. For example, mobile device can receive a code for a product, receive an indication via the display of the mobile device that a person wants to split the cost of the product, and send a payment split indicator to a point of sale (POS) device. The POS device can scan the product, determine a cost for the product, receive the payment spilt indicator, and send the cost and the payment split indicator to a server where the transaction for the product can be authorized and the splitting of the payment can be approved.

15 Claims, 6 Drawing Sheets

PAYMENT SPLITTING

CROSS-REFERENCE TO RELATED APPLICATION(S)

This application is a non-provisional of and claims priority to U.S. Provisional Application No. 62/941,417, filed on Nov. 27, 2019, entitled "PAYMENT SPLITTING," which is hereby incorporated by reference in its entirety for all purposes.

This disclosure is directed generally to systems, methods, and apparatus for splitting payments.

BACKGROUND

Shopping at a physical retail store involves a familiar process. A consumer first obtains one or more items from the retail store, and then the consumer stands in a checkout line to purchase the one or more items. Often, the consumer pays for the one or more items using a physical credit card or a digital credit card stored on the consumer's mobile device. The physical or digital credit card information can be obtained by a point of sale (POS) device that can send such information to a server on the Internet so that a bank can authorize the transaction involving the one or more items.

Figure 1:
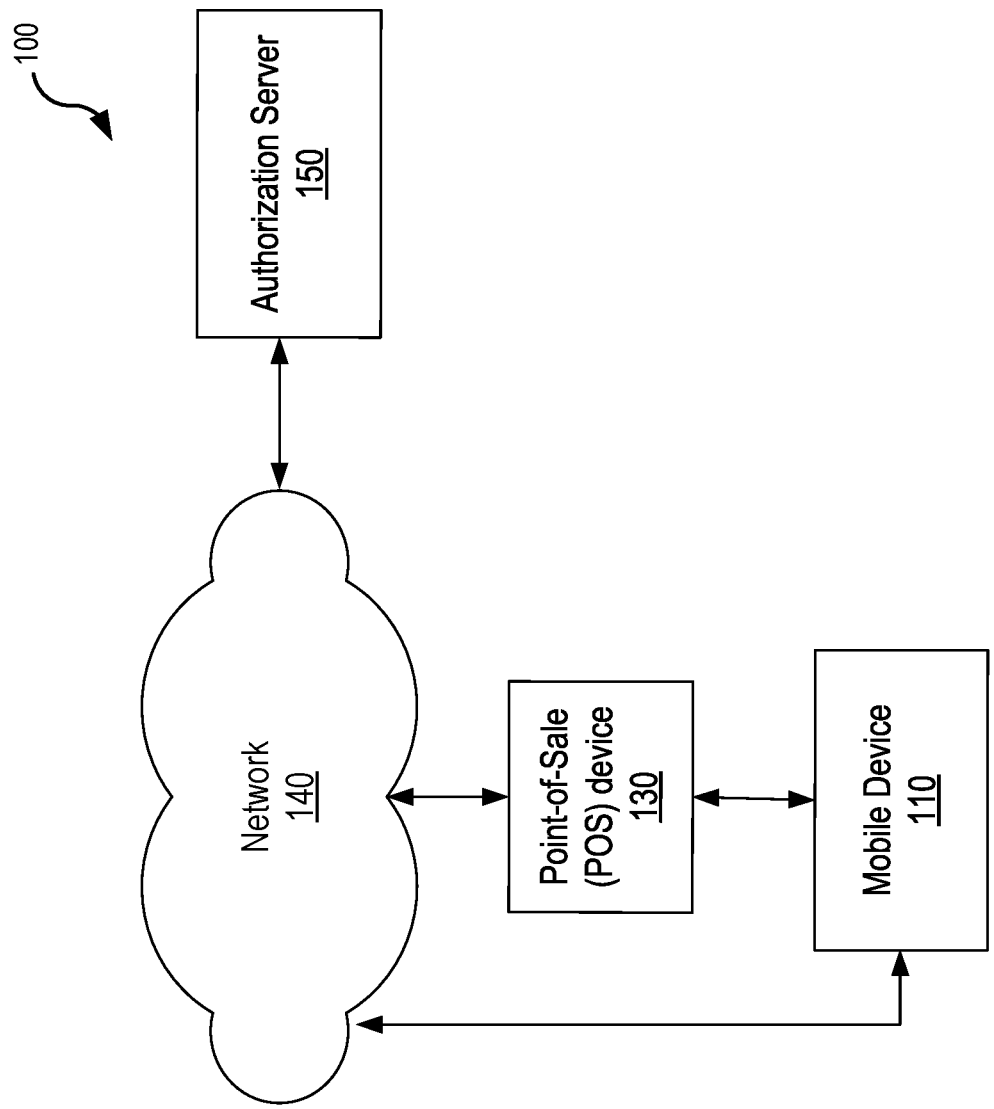
FIG. 1 shows a block diagram of an example payment splitting system.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Customers are often dissuaded from purchasing a product due to the cost of the product. This phenomenon is quantified as a conversion rate which describes a percentage of people who start a process to purchase a product but do not complete the transaction. Conventional payment technology has not been adequately developed to address the issue of a high conversion rate where many people begin a transaction to purchase a product but do not complete the transaction. To address at least this issue with existing technology, this patent document describes payment splitting technology that enables users to split a cost for a product over a number of payments.

In one example, this patent document describes systems, apparatus, and methods to split one or more costs for one or more products being purchased at a point of sale (POS) device. For example, prior to purchasing a product, a person can use his or her mobile device to scan or receive a code for the product that the user wishes to purchase. The mobile device can determine a cost for the product and whether the cost for the product is eligible to be split into a number of payments. The mobile device can display an option for the person to select whether he or she wants to split the cost over the number of payments. If the person selects the option to split payment, the mobile device can generate a payment split indicator for the product.

When the person decides to purchase the product at a POS device at a store, the mobile device can send the payment split indicator to the POS device that sends the cost for the product and the payment split indicator to a server configured to authorize a transaction for the product. The POS device can receive an indication (or message) that indicates that the transaction is authorized and/or whether a splitting of the payment for the product is approved FIG. 1 shows a block diagram of an example payment splitting system 100. An overview of the payment splitting system 100 is first presented below, followed by a detailed presentation of the operations performed by the various systems and devices of the payment splitting system 100 in FIG. 2. FIG. 1 shows a payment splitting system 100 that includes a mobile device 110, a POS device 130, and an authorization server 150 that can communicate with each other over a network 140 (e.g., Internet).

The mobile device 110 can scan or receive codes (e.g., barcode or quick response (QR) code) for one or more products that a person operating the mobile device 110 wants to purchase. The mobile device 110 can also wirelessly send and receive data via a network 140 and can also communicate with the POS device 130. For example, the mobile device 110 and the POS device 130 include a near field communication (NFC) transceiver or a Bluetooth transceiver with which the mobile device 110 and the POS device 130 can communicate with each other. The mobile device 110 can send to the POS device 130 information such whether the person operating the mobile device 110 wants to split payment for the one or more products that the person wants to purchase.

The POS device can scan one or more products to be purchased by a person and can determine one or more costs of the one or more products and/or the total cost of the one or more products. The POS device 130 can communicate with an authorization server 150 via the network 140. The POS device can send the total cost and the payment information received from the person to the authorization server 150 that can determine whether the transaction involving the purchase of the one or more products is authorized.

In some embodiments, the person operating the mobile device 110 can indicate via the mobile device 110 whether he or she wants to split one or more costs for one or more products. In such embodiments, the mobile device 110 can generate and send a payment split indicator for the one or more products to the POS device 130, whereupon the POS device 130 can send such a payment split indicator along with the total cost of the one or more products to the authorization server 150. In some embodiments, the person who wants to purchase the one or more products can split a payment for each of the one or more costs for the one or more products, or split a payment for the total cost of the one or more products, or split at least one cost of at least one product from the one or more products to be purchased.

In some embodiments, another person operating the POS device 130 can indicate via the POS device 130 whether a person who wants to purchase the one or more products wants to split one or more costs for one or more products. In such embodiments, the POS device 130 can generate and send a payment split indicator for the one or more products along with the total cost of the one or more products to the authorization server 150.

Figure 2:
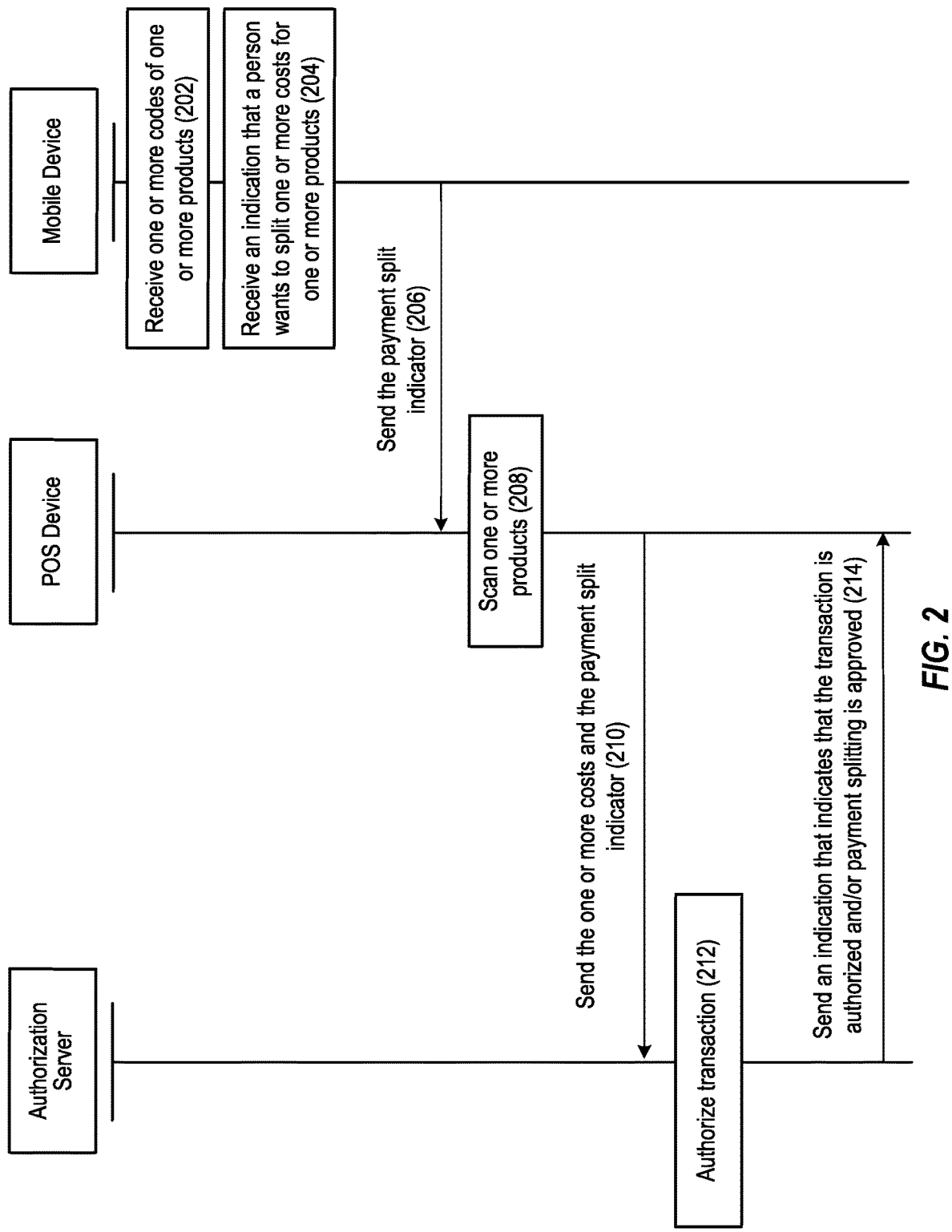
FIG. 2 shows a flowchart of operations performed by the payment splitting system where a mobile device is used to indicate that a person wants to split one or more costs of one or more products to be purchased.

FIG. 2 shows a flowchart of operations performed by the payment splitting system where a mobile device is used to indicate that a person wants to split one or more costs of one or more products to be purchased. At operation 202, a payment splitting module of the mobile device (shown as 460 in FIG. 4) can receive one or more codes for one or more products that a person operating the mobile device wants to purchase. For example, as a person is shopping for products at a store, the person can scan barcodes of the products using a camera associated with the mobile device. The payment splitting module can receive the one or more codes and can determine the cost of each product based on the one or more codes. In some embodiments, the payment splitting module can display the cost of each scanned product and the total cost of the one or more products including any taxes.

At operation 204, the person operating the mobile device can press a button on a graphical user interface (GUI) shown on a display of the mobile device to indicate that he or she wants to split the one or more costs of the one or more products to be purchased. In some embodiments, an offer to split the payments is received by the mobile device. The payment splitting module of the mobile device can generate the button on the GUI that allows the person operating the mobile device to perform his or her selection. In some embodiments, the button may include at least two options-a first option that accepts payment splitting and a second option that declines payment splitting.

At operation 206, the payment splitting module of the mobile device can generate and wirelessly send a payment split indicator to the POS device. Continuing with the example mentioned above where a person is shopping at a store, when the person decides to checkout and pay for the one or more products, a cashier operating the POS device can scan one or more products at operation 208 using, for example, a barcode scanner. The POS device can also receive a payment split indicator sent by the mobile device. For example, the mobile device can transmit the payment split indicator via NFC or Bluetooth transceiver. A technical benefit of using short range wireless technology such as NFC or Bluetooth is that it can minimize the chances of having the POS device receive a payment split indicator from another mobile device from an adjacent checkout lane.

At operation 210, a payment generation module of the POS device (shown as 560 in FIG. 5) can determine and send one or more cost of the one or more scanned products to the authorization server. The payment generation module can also send to the authorization server the payment split indicator that the POS device received from the mobile device. In some embodiments, the one or more costs sent by the POS device may include a total cost of the transaction. At operation 212, the authorization server can authorize the transaction involving the one or more products. At operation 214, the authorization server can send an indication (e.g., via an internet protocol (IP) packet) that indicates that the transaction is authorized and/or that the payment splitting is approved.

In some embodiments, instead of indicating the payment splitting via the mobile device, the POS device can be used to indicate that a person intends to split payment for the one or more products. In such embodiments, the POS device can scan the one or more products and display an option for a customer to indicate whether he or she wants to split one or more costs associated with the one or more products. The person operating the POS device can press a button on a GUI of the POS device's display to indicate that the customer wants to split the one or more costs of the one or more products to be purchased. The payment generation module of the POS device can generate the button on the GUI that allows the person operating the POS device to perform a selection on the customer's behalf. The payment generation module can generate and send the payment split indicator along with the one or more costs of the one or more products to the authorization server for authorization. In such embodiments, the authorization server can send an indication that indicates that the transaction is authorized and/or that the payment splitting is approved.

Figure 3A:
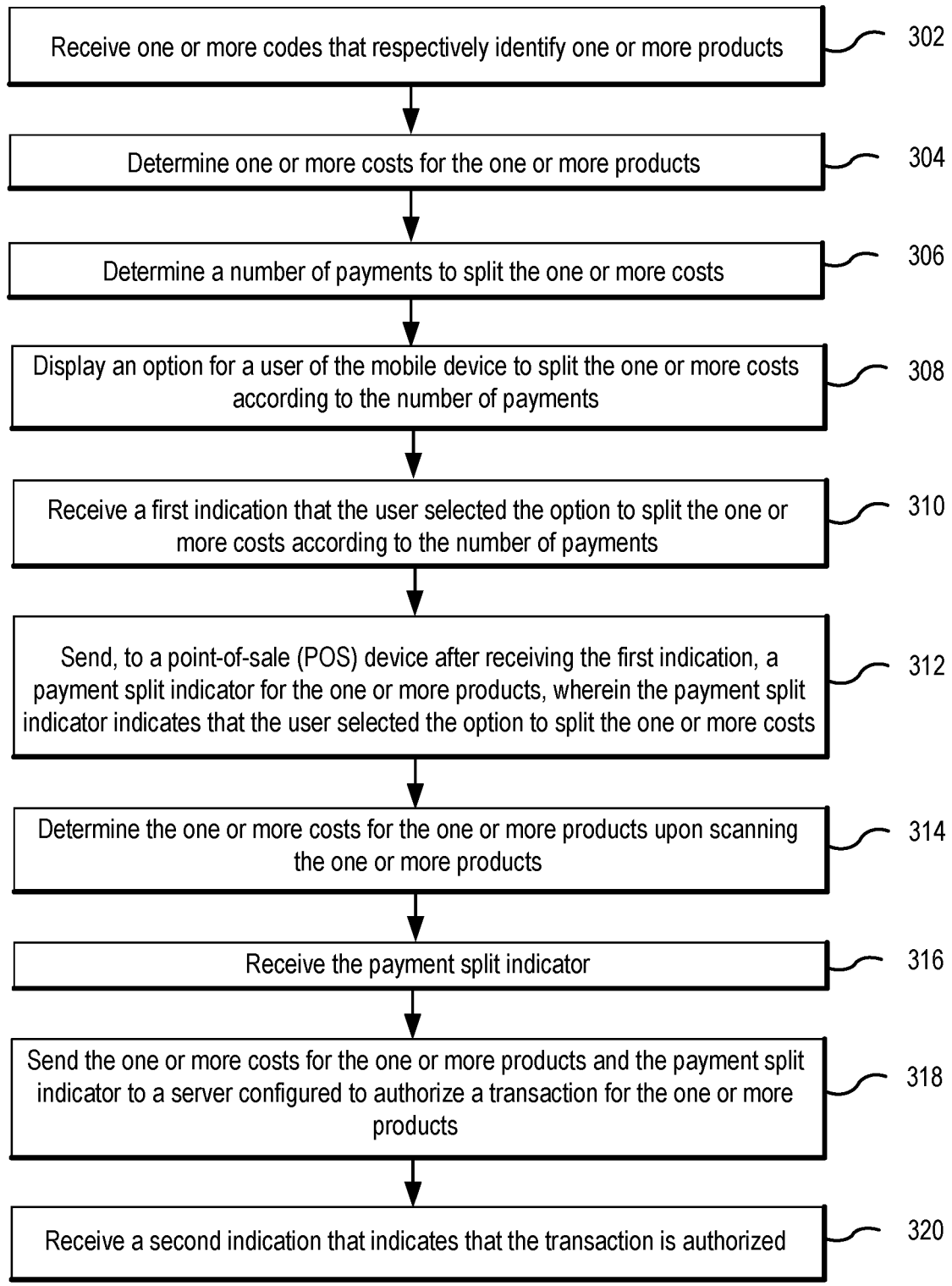
FIG. 3A shows a flowchart of operations performed by a payment splitting system where a mobile device is used to indicate that a person wants to split one or more costs of one or more products to be purchased.

FIG. 3A shows a flowchart of operations performed by a payment splitting system where a mobile device is used to indicate that a person wants to split one or more costs of one or more products to be purchased. Operations 302 to 312 can be performed by a payment splitting module of the mobile device and operation 314 to 320 can be performed by a payment generation module of the POS device.

At operation 302, the payment splitting module of the mobile device receives one or more codes that respectively identify one or more products. For example, the payment splitting module can receive the code(s) from the mobile device's camera that can be used to scan one or more codes of the one or more products. In some embodiments, the one or more codes includes one or more barcodes or one or more quick response (QR) codes, and the one or more codes are received by the mobile device via a camera. At operation 304, the payment splitting module can determine one or more costs for the one or more products. For example, based on a product identifier included in a code for a product, the payment splitting module can obtain a cost of the product at a store by performing a search on a database associated with the store via the Internet.

At operation 306, the payment splitting module determines a number of payments to split the one or more costs. In some embodiments, the payment splitting module can describe the number of payments as total number of payments to split a total cost of the one or more costs. In some embodiments, the payment splitting module can describe the number of payments for splitting one of the one or more costs for one of the one or more products. In some embodiments, the payment splitting module can split into the number of payments each of the one or more cost of the one or more products.

At operation 308, the payment splitting module displays on the mobile device an option (e.g., button on a GUI) for a user of the mobile device to split the one or more costs according to the number of payments. At operation 310, the payment splitting module receives a first indication that the user selected the option to split the one or more costs according to the number of payments. At operation 312, the payment splitting module sends, to a point-of-sale (POS) device after receiving the first indication, a payment split indicator for the one or more products, where the payment split indicator indicates that the user selected the option to split the one or more costs.

At operation 314, the payment generation module of the POS device determines the one or more costs for the one or more products upon scanning the one or more products. The POS device can scan the one or more products via a barcode scanner. At operation 316, the payment generation module receives the payment split indicator. At operation 318, the payment generation module sends the one or more costs for the one or more products and the payment split indicator to a server configured to authorize a transaction for the one or more products. At operation 320, the payment generation module receives a second indication that indicates that the transaction is authorized. In some embodiments, the second indication further indicates that a splitting of the payment for the one or more products is approved.

In some embodiments, a geofencing technology can be employed by the mobile device. For example, prior to receiving the one or more codes the payment splitting module of the mobile device can determine that the mobile device is located in a pre-determined area of a shopping facility, and display a message to the user to indicate that the user is eligible to split payment for items in the shopping facility. In embodiments where geofencing can be employed, the payment splitting module of the mobile device may receive the one or more codes, as shown in operation 302, after the message is displayed.

Figure 3B:
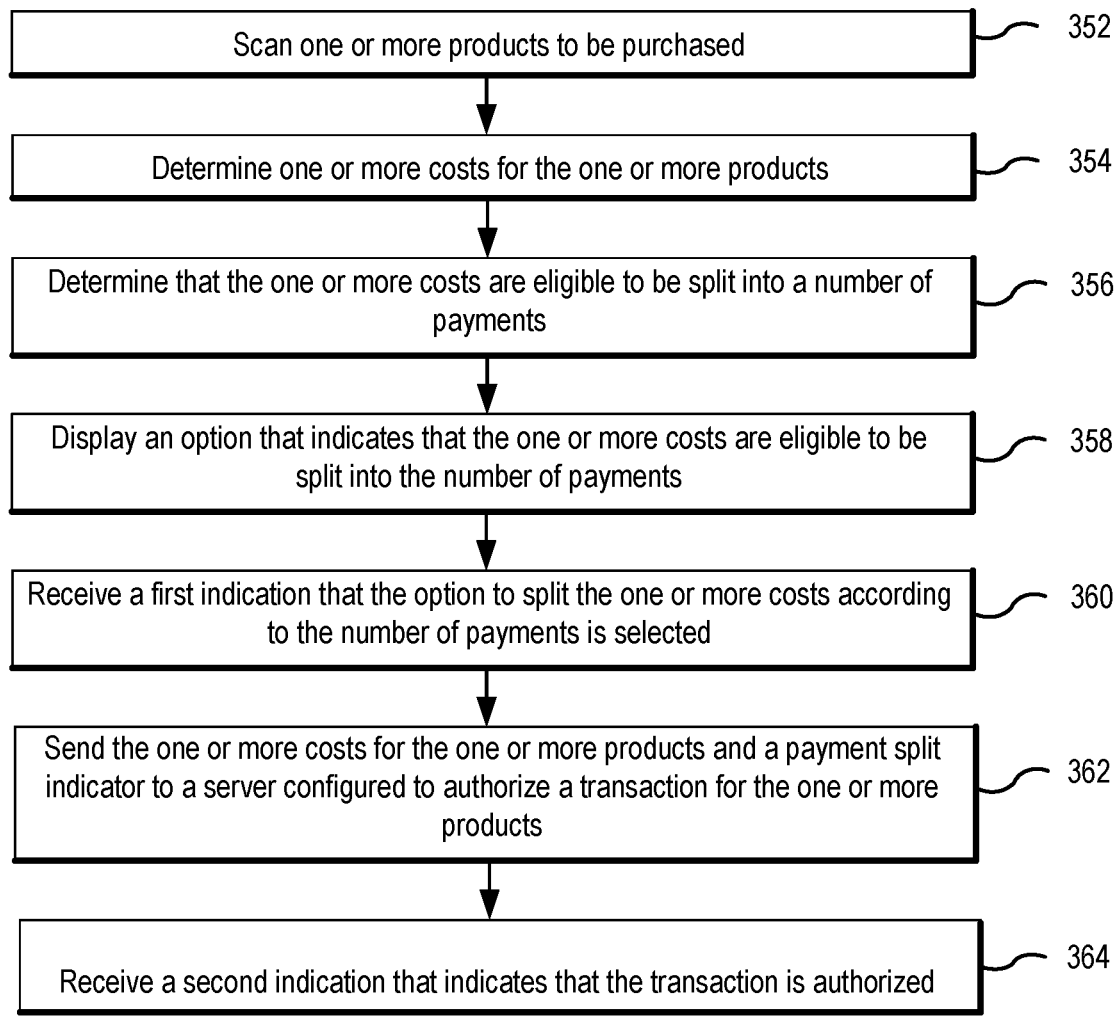
FIG. 3B shows another flowchart of operations performed by a payment splitting system where a point of sale (POS) device is used to indicate that a person wants to split one or more costs of one or more products to be purchased.

FIG. 3B shows another flowchart of operations performed by a payment splitting system where a POS device is used to indicate that a person wants to split one or more costs of one or more products to be purchased. Operations 352 to 364 can be performed by a payment generation module of the POS device. At operation 352, a payment generation module of the POS device scans one or more products to be purchased. At operation 354, the payment generation module determines one or more costs for the one or more products.

At operation 356, the payment generation module determines that the one or more costs are eligible to be split into a number of payments. For example, at operation 356, the payment generation module can search a database stored on a server in communication with the POS device, where the database lists products whose costs are eligible to be split.

In some embodiments, the payment generation module can describe the number of payments as total number of payments to split a total cost of the one or more costs. In some embodiments, the payment generation module can describe the number of payments for splitting one of the one or more costs for one of the one or more products. In some embodiments, the payment generation module can split into the number of payments each of the one or more cost of the one or more products.

At operation 358, the payment generation module, upon determining that the one or more costs are eligible to be split, displays an option that indicates that the one or more costs are eligible to be split into the number of payments. At operation 360, the payment generation module receives a first indication that the option to split the one or more costs according to the number of payments is selected. At operation 362, the payment generation module sends the one or more costs for the one or more products and a payment split indicator to a server configured to authorize a transaction for the one or more products, where the payment split indicator indicates that the option was selected to split the one or more costs. At operation 364, the payment generation module receives a second indication that indicates that the transaction is authorized. In some embodiments, the second indication further indicates that a splitting of the payment for the one or more products is approved.

In some embodiments for the methods described in FIGS. 3A and 3B, a machine learning technique is used to determine that a cost for at least one of the one or more products is eligible to be split into the number of payments.

Figure 4:
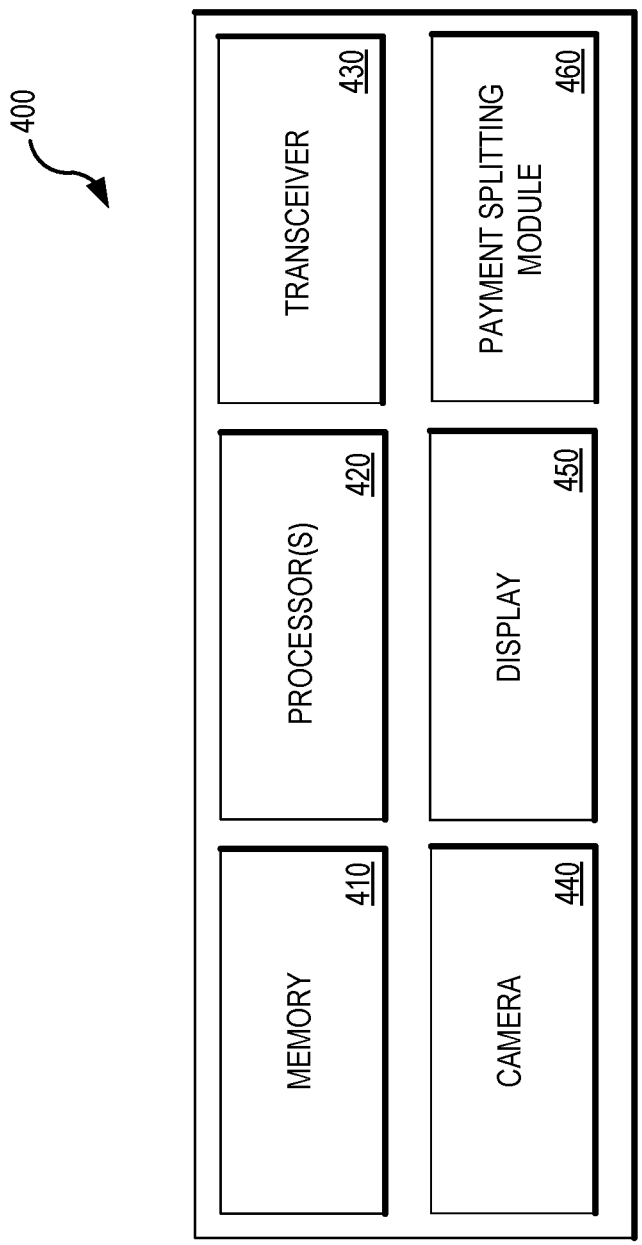
FIG. 4 shows a block diagram of a mobile device.

FIG. 4 shows a block diagram of a mobile device. The mobile device 400 includes at least one processor 420 and a memory 410 having instructions stored thereupon. The instructions upon execution by the processor 420 configure the mobile device 400 to perform the operations described for the camera 440, display 450, and the payment splitting module 460 as described in FIGS. 2, and 3A and/or in the various embodiments in this patent document. The mobile device 400 includes a transceiver 430 (e.g., NFC or Bluetooth transceiver) that includes a transmitter to send a payment split indicator to the POS device.

Figure 5:
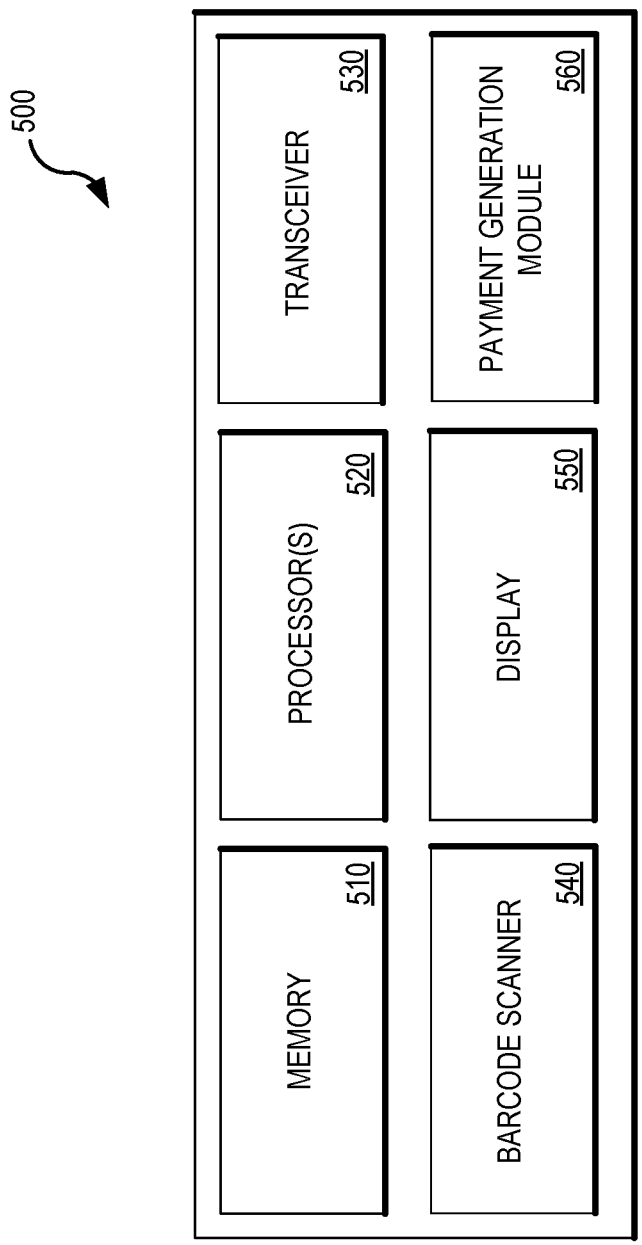
FIG. 5 shows a block diagram of a POS device.

FIG. 5 shows a block diagram of a POS device. The POS device 500 includes at least one processor 520 and a memory 510 having instructions stored thereupon. The instructions upon execution by the processor 520 can configure the POS device 500 to operate the barcode scanner 540 to scan one or more products and to perform operations described for the display 550 and the payment generation module 560 as described in FIGS. 2, 3A, and 3B and/or in the various embodiments in this patent document. The POS device 500 includes a transceiver 530 (e.g., NFC or Bluetooth transceiver) that includes a receiver to receive the payment split indicator from the mobile device.

Those skilled in the art will appreciate that the components illustrated in FIG. 1-5 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology.

In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for splitting a payment, comprising:
a mobile device configured to:
  determine the mobile device is located in a pre-determined area of a facility based on geofencing associated with the facility, wherein the facility is offering one or more products;
  in response to determining the mobile device is located in the pre-determined area, display, via a user interface, a message that a user of the mobile device is eligible to split at least one cost associated with the one or more products into two or more installments;
  capture, via at least one camera, one or more codes that respectively identify the one or more products;
  determine one or more costs for the one or more products based on payment data associated with the one or more codes;
  determine a number of payments to split the one or more costs;
  display, via the user interface, an option for a user of the mobile device to split the one or more costs according to the number of payments;
  receive a first indication that the user selected the option to split the one or more costs according to the number of payments;
  connect to a point-of-sale (POS) device via a near field communication connection;
  in response to receiving the first indication, send, to the POS device via the near field communication connection after receiving the first indication, a payment split indicator for the one or more products, wherein the payment split indicator indicates that the user selected the option to split the one or more costs;
the POS device configured to:
  determine the one or more costs for the one or more products upon scanning the one or more products;
  receive the payment split indicator from the mobile device via the near field communication connection;
  send the one or more costs for the one or more products and the payment split indicator to an authorization server configured to authorize a transaction for the one or more products; and receive, from the authorization server, a second indication that indicates the one or more products are eligible for payment splitting and the transaction is authorized.

2. The system of claim 1,
wherein the number of payments describe a total number of payments to split a total cost of the one or more costs, or
wherein the number of payments is described for splitting one of the one or more costs for one of the one or more products, or
wherein the number of payments is described for splitting each of the one or more costs.

3. The system of claim 1, wherein the second indication further indicates that a splitting of the payment for the one or more products is approved.

4. The system of claim 1, wherein a machine learning technique is used to determine that a cost for at least one of the one or more products is eligible to be split into the number of payments.

5. The system of claim 1, wherein the one or more codes includes one or more barcodes or one or more quick response (QR) codes, and wherein the one or more codes are received by the mobile device via a camera.

6. A method of splitting a payment performed by a mobile device, the method comprising:
determining the mobile device is located in a pre-determined area of a facility based on geofencing associated with the facility, wherein the facility is offering one or more products;
in response to determining the mobile device is located in the pre-determined area, displaying, via a user interface, a message that a user of the mobile device is eligible to split at least one cost associated with the one or more products into two or more installments;
capturing, via at least one camera, one or more codes that respectively identify the one or more products;
determining one or more costs for the one or more products based on payment data associated with the one or more codes;
determining a number of payments to split the one or more costs;
displaying, via the user interface, an option for a user of the mobile device to split the one or more costs according to the number of payments;
receiving a first indication that the user selected the option to split the one or more costs according to the number of payments;
connecting to a point-of-sale (POS) device via a near field communication connection; and
in response to receiving the first indication, sending, to the POS device via the near field communication connection, a payment split indicator for the one or more products,
wherein the payment split indicator indicates that the user selected the option to split the one or more costs, and
wherein the POS device is configured to determine the one or more costs for the one or more products upon scanning the one or more products, receive the payment split indicator, send the one or more costs and the payment split indicator to an authorization server, and receive a second indication from the authorization server that indicates the one or more products are eligible for payment splitting and a transaction for the one or more products is authorized.

7. The method of claim 6,
wherein the number of payments describe a total number of payments to split a total cost of the one or more costs, or
wherein the number of payments is described for splitting one of the one or more costs for one of the one or more products, or
wherein the number of payments is described for splitting each of the one or more costs.

8. The method of claim 6, wherein the second indication further indicates that a splitting of the payment for the one or more products is approved.

9. The method of claim 6, wherein a machine learning technique is used to determine that a cost for at least one of the one or more products is eligible to be split into the number of payments.

10. The method of claim 6, wherein the one or more codes includes one or more barcodes or one or more quick response (QR) codes, and wherein the one or more codes are received by the mobile device via a camera.

11. A non-transitory machine-readable medium having machine executable instructions stored thereon that, when executed by one or more processors, direct the one or more processors to perform a method comprising:
determining a mobile device is located in a pre-determined area of a facility based on geofencing associated with the facility, wherein the facility is offering one or more products;
in response to determining the mobile device is located in the pre-determined area, displaying, via a user interface, a message that a user of the mobile device is eligible to split at least one cost associated with the one or more products into two or more installments;
capturing, via at least one camera of the mobile device, one or more codes that respectively identify the one or more products;
determining one or more costs for the one or more products based on payment data associated with the one or more codes;
determining a number of payments to split the one or more costs;
displaying an option for a user of the mobile device to split the one or more costs according to the number of payments;
receiving a first indication that the user selected the option to split the one or more costs according to the number of payments;
connecting to a point-of-sale (POS) device via a near field communication connection; and
in response to receiving the first indication, sending, to the POS device via the near field communication connection, a payment split indicator for the one or more products,
wherein the payment split indicator indicates that the user selected the option to split the one or more costs, and
wherein the POS device is configured to determine the one or more costs for the one or more products upon scanning the one or more products, receive the payment split indicator, send the one or more costs and the payment split indicator to an authorization server, and receive a second indication from the authorization server that indicates the one or more products are eligible for payment splitting and a transaction for the one or more products is authorized.

12. The non-transitory machine-readable medium of claim 11,
- wherein the number of payments describe a total number of payments to split a total cost of the one or more costs, or
- wherein the number of payments is described for splitting one of the one or more costs for one of the one or more products, or
- wherein the number of payments is described for splitting each of the one or more costs.

13. The non-transitory machine-readable medium of claim 11, wherein the second indication further indicates that a splitting of the one or more costs for the one or more products is approved.

14. The non-transitory machine-readable medium of claim 11, wherein a machine learning technique is used to determine that a cost for at least one of the one or more products is eligible to be split into the number of payments.

15. The non-transitory machine-readable medium of claim 11, wherein the one or more codes includes one or more barcodes or one or more quick response (QR) codes, and wherein the one or more codes are received by the mobile device via a camera.

* * * * *